US008028462B2

(12) United States Patent
Sieman

(10) Patent No.: US 8,028,462 B2
(45) Date of Patent: Oct. 4, 2011

(54) RIGID-ROD-ANCHOR-WEIGHT ASSEMBLY

(76) Inventor: Robert A. Sieman, Amherst, NY (US)

(*) Notice: Subject to any disclaimer, the term of this patent is extended or adjusted under 35 U.S.C. 154(b) by 0 days.

(21) Appl. No.: 12/643,425

(22) Filed: Dec. 21, 2009

(65) Prior Publication Data

US 2010/0115819 A1 May 13, 2010

Related U.S. Application Data

(63) Continuation-in-part of application No. 12/168,167, filed on Jul. 7, 2008, now abandoned, and a continuation-in-part of application No. 11/155,696, filed on Jun. 17, 2005, now abandoned.

(51) Int. Cl.
*A01M 31/06* (2006.01)
(52) U.S. Cl. .............................................. 43/3
(58) Field of Classification Search ............ 43/2, 3
See application file for complete search history.

(56) References Cited

U.S. PATENT DOCUMENTS

| 2,616,200 A | * | 11/1952 | Milam | 43/3 |
| 2,909,859 A | * | 10/1959 | Christmas | 43/3 |
| 5,970,901 A | * | 10/1999 | Bruce | 114/293 |
| 6,857,216 B1 | * | 2/2005 | Merin | 43/3 |

* cited by examiner

*Primary Examiner* — Kimberly S Smith
(74) *Attorney, Agent, or Firm* — Simpson & Simpson, PLLC

(57) ABSTRACT

A lineless rigid-rod-anchor-weight assembly provides for anchoring, throwing, and retrieving a decoy or a set of decoys without any tangling of the members of the set. The assembly is attachable to floating object and includes a rigid-rod permanently molded into an environmentally safe, hermetically encapsulated, lead weight. The impermeable encapsulate may be a polyvinylchloride. The rod may be fiberglass or a naturally-occurring material exhibiting rigidity with limited flexure. The floating object may be a decoy, such as a puddle duck decoy with a keel having a receiver aperture for receiving the anchor-weight attachment means. One end of the attachment may be a clip connector means for fastening the attachment means to the floatable object and may also be attached to the rod. Alternatively, if the decoy has a receiver aperture above the keel, the anchor-weight attachment means comprises an adapter to provide for such attachment.

13 Claims, 6 Drawing Sheets

RIGID-ROD-ANCHOR-WEIGHT ASSEMBLY

CROSS-REFERENCE TO RELATED APPLICATIONS

This Continuation-in-Part Application claims the benefit of application Ser. No. 11/155,696 filed Jun. 17, 2005, now abandoned, and Continuation-in-Part application Ser. No. 12/168,167 filed Jul. 7, 2008 now abandoned.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to anchors, and more particularly, to environmentally safe anchor assemblies for anchoring floating objects that prevent tangling of the anchored floating objects with each other or with aquatic plants.

The background information discussed below is presented to better illustrate the novelty and usefulness of the present invention. This background information is not admitted prior art.

It is common for hunters when hunting water fowl such as ducks and geese to place decoys on the water to encourage ducks and geese flying overhead to land. The two major classes of ducks hunted are puddle ducks and diving ducks. Puddle ducks, also referred to as dipping, surface-feeding, pond, river, or freshwater ducks are physically and behaviorally different from diving ducks. Physically, puddle ducks differ from diving ducks, in that puddle ducks have unlobed hind feet that are also smaller than the hind feet of diving ducks. This accounts for the fact that puddle ducks rarely dive for their food and, therefore, are most often found feeding in shallow water. Puddle ducks, such as mallards, black ducks, mottled ducks, Mexican ducks, pintails, gadwalls, American wigeons, shovelers, wood ducks, green-winged teal, blue-winged teal, cinnamon teal, fulvous tree duck, black-bellied tree ducks, and American coots, mainly feed on water plants that they obtain by tipping tail-end up in shallow water. In addition to eating water plants, puddle ducks often forage near shore for seeds and insects.

A typical puddle duck decoy mimics the shape and color of shallow water ducks and frequently is equipped with a weighted keel extending lengthwise from along the decoy's bottom centerline to help maintain the stability of the decoy as it floats on the shallow surface part of a lake, stream, or marsh pond. In order for the decoys to be kept in a desired position, the decoys must be attached to an anchor weight that will anchor the decoy on the bottom of the lake, stream, or marsh pond. The weight helps to keep the decoy relatively stationary against the effects of wind or water movement that may be caused by changes in the tide level or by a river current. In currently available decoys and anchors, whenever the decoy has a keel, one end of a length of flexible line is tied to a tying aperture in the keel and the other end of the flexible line is attached to the anchor weight.

SUMMARY

At the heart of the present invention is the inventor's recognition that the use of presently available decoy anchor weights when hunting shallow water puddle ducks present several challenges. To keep a decoy from moving out of the position it was set in by the hunter, the anchor weight must be as heavy as possible. To this end, many of the presently available decoy anchor weights are made of lead because of its high specific gravity, although some are made of other metals. Lead, however, is a well known serious pollutant, when allowed to come into contact with water. If the anchor weight is made of a different unprotected metal, one that is not as polluting as lead, it is the metal weight that is likely to be adversely affected by the environment. For example, steel or iron decoy anchors are subject to corrosion during use and when in storage and soon become unsightly if not maintained by the application of a coat of paint that is made especially for such a use. The paint, however, if copper based, also is a pollutant. Another vexation identified by the inventor was the tangling between and among that commonly occurred between and among the flexible lines used to attach the decoy to the anchor-weight. Tangling not only occurs between and among the decoys while positioned in the water, but also as the decoys are put into and taken out of storage. In addition, the flexible lines of the currently available anchor weights become tangled with the water weeds in the hunting area. Such flexible lines are known to be made of latex elastic tubing to which a length of flexible cord is often added depending on how deep the water body in which the decoys with the anchor weights are being set. To better simulate natural conditions, hunters routinely use several decoys at one time. Thus, before traveling to the hunting site, a decoy set is typically retrieved from its storage place, which is usually a large sack. As mentioned above, each decoy is attached to its own anchor-weight by a flexible line and, frequently, as the decoys are removed from the storage bag, the flexible lines become tangled and need to be untangled. During transport, a hunter may wrap each flexible line around the decoy to which is fastened in an attempt to avoid further tangling. But, as there is no way to fasten the loose ends of the lines to the decoy or to themselves, the lines and weights often become loose and once again become entangled, which, of course, could happen even if the decoys were carried to the site in their storage bag. Moreover, while carrying the decoys to the hunting site, the weights hanging from the connecting flexible lines often knock against the decoys, thus scratching the decoy paint and making a noise that would scare off the birds being hunted when within the hunting area.

Once the decoys are transported to the hunting site, they have to be carefully positioned in the water. A realistic looking, well-placed decoy spread entices more ducks to take come closer to investigate the decoy spread. Proper placement of the decoys results in fewer decoys being needed to attract the hunted ducks, especially when hunting puddle ducks, as puddle ducks, especially early in the hunting season, usually are in smaller groups than diver ducks, and, thus, require fewer decoys to get their attention. The inventor realized that he can attract ducks using fewer decoys, and also become more mobile when he has fewer decoys to place and retrieve every time there is a change in hunting location. Increased mobility means more time to hunt ducks. Throwing the decoys to create a properly place decoy spread, however, is not a straightforward effort. Working with decoys attached to weights by flexible cords means that each decoy has to be set by itself to avoid tangling the lines as the decoys are put into position in the water. And, once in the water it is difficult to place the decoys so that their lines do not become tangled either with each other or with the ubiquitous water plants present in the areas where puddle ducks are found. Moreover, retrieving the decoys means retrieving each decoy separately to keep the lines once again would become tangled. The inventor came to realize that setting and retrieving decoys that are attached to anchor weights using a flexible line is a time and energy consuming process and decided to devise a way to have each decoy connected held to its anchor-weight by a connecting means that would eliminate tangling of the decoys with other decoys during throwing, floating, retrieval, transport, and storage of the decoys and their anchor attachment assemblies and that would eliminate tangling of the decoys with plant life.

Accordingly, the inventor devised a set of principles, that when followed result in a lineless (i.e., does not have a flexible and/or elastic line holding the anchor to the weight at the required distance) anchor-weight assembly that provides for storing, transporting, throwing, and retrieving a set of decoys all at the same time without the aggravation of tangling of flexible lines thus saving time and energy that could be better used for hunting. The lineless anchor-weigh assembly, as taught herein, is attractive in appearance, requires little or no maintenance, is non-polluting, is easily and compactly stored even while remaining attached to the decoy, and does not rely on a flexible line to connect each decoy to its anchor, thus, preventing the decoys from becoming tangled with each other or with plant life during storage, transport, throwing, floating, and retrieval and where an entire set of decoys can be thrown and retrieved all at the same time, thus saving precious hunting time.

The anchor assembly made according to the principles of the present invention comprises a mostly rigid (i.e., has a minimum bend radius of from 50 to 80 times its diameter), non-elastic, non-flexible rod to attach a decoy to an anchor-weight. In fact, the rigid connecting rod is permanently molded into and with the anchor-weight. Thus, fixedly and moldedly connected to the rigid connecting rod at one end is the anchor-weight and connected to the rod at its other end is a snap-lock attachment for attaching the anchor-weight assembly to a floatable object, such as a duck decoy. Thus, an anchor-weight assembly made according to the principles of the present invention, even when attached to a floatable object, such as a duck decoy can not become tangled with other lineless decoys, nor is it likely to become tangled with plant life that grows in the water. Moreover, the lineless anchor-weight assembly made following the principles of the present invention will not become tangled during storage, transport, throwing, floating, and retrieval. Furthermore, the lineless rigid-rod anchor-weight assembly provides for throwing and retrieving an entire set of decoys, all at the same time, thus saving hunters from minutes to hours in preparation time, as well as saving similar amounts of time at the end of the hunt when the decoys must be retrieved, transported, and put away in storage. The lineless rigid-rod anchor-weight assembly of the present invention is ideal for use in flooded fields, swamps, or any open water shallows.

The lineless rigid-rod anchor-weight assembly of the present invention eliminates tangling decoy lines by eliminating the use of flexible lines. The decoy-attachable anchor-weight assembly according to the principles of the present invention utilizes a solid rod that is rigid with a limited amount of flexure (i.e., has a minimum bending radius of 50-80 times the diameter of the rod), molded directly into a lead weight. The rod is not elastic, as changes in length could make the assembly useless for its intended purpose. Moreover, lead pollution concerns are eliminated by the weight being molded together, at the same time, during the same operation, with the rigid rod in a watertight, sealed encapsulate.

The decoy anchor as taught herein provides other advantages in addition to providing an attractive, non-polluting weight for use with puddle duck decoys. The length of the rigid-rod that connects the anchor weight to a floatable object can easily be made of a variety of desired lengths. For example, when used for anchoring puddle duck decoys, the length of the relatively rigid connecting rod is calculated based on the average water depth that species of waterfowl inhabits. Puddle ducks feed in water that is 18 inches deep or less and will normally land in water of the same average depth, therefore, when the anchor-weight assembly of the present invention is used to anchor puddle duck decoys, the length of the rigid-rod that is permanently molded into the anchor weight is approximately 14-32 inches. In addition to anchoring the decoys, the anchor provides for a handle to carry the decoys attached to the decoy anchor to and from the hunting site. Because the rigid-like anchor rods cannot become tangled, all of the decoys may be carried to and from the site simultaneously.

Once the hunting site is reached, instead of having to set each decoy individually, several, or all, of the decoys may be thrown at the same time without the worry of line tangling. Prior concerns of having lines wrapping about the decoys and tangling with one another has been eliminated. Once the decoys have been placed in the water, the anchor-weight, molded onto the rod, settles to the bottom of the water body to hold the decoys in place.

When hunting is finished for the day, the decoys are lifted from the water using the encapsulated anchor-weight rigid-rod as a comfortable and functional carrying handle. All of the decoys may be carried at the same time, again without fear of having lines tangled. Multiple trips to and from the water to retrieve each decoy are eliminated. This saves valuable time, as well as eliminating frustration when setting up the decoy spread and when bringing the decoys in at the end of the day.

The present invention also provides for efficient storage and transport of the decoys with or without the lineless rigid-rod anchor-weights attached to the decoys. After retrieving all of the decoys, the lineless rigid-rod-anchor-weight assemblies may be left attached to the decoys for easy placement of the decoys into the decoy bag and for easy retrieval of the decoys/anchors from the bag. If desired, however, the lineless rigid-rod-anchor-weight assemblies may be rapidly detached from the decoys simply by opening the heavy duty clasp or clip that is part of each of the attachment means of the lineless anchor-weight assembly.

Moreover, lineless rigid-rod-anchor-weight assembly of the present invention provides for its attachment directly to the anchor line receiving hole that is present in the keel of most duck decoys. The decoy rigid-rod-anchor-weight assembly of the present invention also provides for the attachment of the rigid-rod-anchor-weight assembly to those decoys that have their anchor attachment receiver hole above the keel by providing for adapters.

The present invention supplies all of these benefits and more by providing for an apparatus, comprising a lineless rigid-rod-anchor-weight assembly, comprising:
    a rigid-rod having a first end and a second end,
    a metal anchor-weight,
        the rigid-rod having a length sufficient so to serve as the agent connecting the anchor weight grounded on the bottom of a water body and an object floating on the surface of the water body, the rigid-rod having a minimum bend radius of at least 50-80 times the diameter of the rigid-rod,
the second end of the rigid-rod permanently molded into the metal permanently molded into a waterproof casing so as to form a rigid-rod-anchor weight.

Wherein the rigid-rod is of a length determined by the depth of the water in which the rigid-rod-anchor-weight assembly will be used.

Wherein the apparatus further has one or more attachment device, such as a clip, wherein the attachment device is detachably attached to the first end of the rigid-rod, and wherein the attachment device is structured so as to detachably attach the rigid-rod-anchor-weight assembly to a floatable object so as to maintain the object in a desired floating position eliminating the use of flexible lines to connect the anchor weight to the floatable object preventing tangling of such flexible lines.

Wherein the attachment device is a Coast Lock style clip.

Wherein the metal anchor weight is impermeably sealed so as to prohibit the anchor weight from interacting with the environment, and further wherein the anchor weight is impermeably sealed using a synthetic organic polymer, and wherein the synthetic organic polymer may be a polyvinylchloride.

Wherein the rigid rod is made from a synthetic organic polymer, and further wherein the synthetic organic polymer is a fiberglass or further wherein the rigid rod is made from a naturally-occurring material.

Wherein the attachment device further comprises a flexible fastener having a first fastener end and a second fastener end, where the first fastener end is adapted for fastening to the floatable object through an aperture spaced from the bottom of the floatable object, and the second fastener end adapted for fastening to the first end of the rigid rod.

Further comprising wherein the metal anchor weight permanently molded into a waterproof casing further comprises a first end and a second end, the first end operatively fitted with an impermeable end cap and further comprising wherein the second end of the metal anchor weight metal is operatively fitted with an impermeable end cap having a flange for securing the anchor weight to the floor of a water body.

Furthermore, an anchor weight assembly, comprising:
a lineless rigid-rod anchor-weight assembly in combination with a floatable decoy, the anchor-weight assembly comprising:
a rigid-rod anchor-weight assembly, comprising:
a rigid-rod having a first end and a second end,
a metal anchor weight,
the rigid-rod having a minimum bend radius of at least 50-80 times the diameter of the rigid-rod,
the second end of the rigid-rod permanently molded into the metal permanently molded into a waterproof casing so as to form a rigid-rod anchor weight,
one or more attachment devices attached to the second end so as to be operative for attaching the rigid-rod anchor-device to the floatable decoy, further comprising wherein the rigid-rod is a fiberglass rod, wherein at least one of the attachment devices further comprises a Coast Lock style clip.

And, also presenting a method, comprising:
a method for making a rigid-rod anchor weight assembly,
providing for a rigid-rod having a first end and a second end,
providing for a metal anchor weight,
the rigid-rod having a length sufficient so to serve as the agent connecting the anchor weight grounded on the bottom of a water body and an object floating on the surface of the water body
the rigid-rod and a minimum bend radius of at least 50-80 times the diameter of the rigid-rod,
molding the second end of the rigid-rod permanently into the metal permanently molded into a waterproof casing so as to form a rigid-rod anchor weight, and further providing for one or more attachment devices, such as a clip and
attaching at least one of the attachment devices to the second end of the rigid-rod so as the attachment device is operative for attaching the rigid-rod anchor-device to floatable decoy.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which.

A LIST OF THE REFERENCE NUMERAL AND PARTS WHICH THEY REFER

Figure 1:
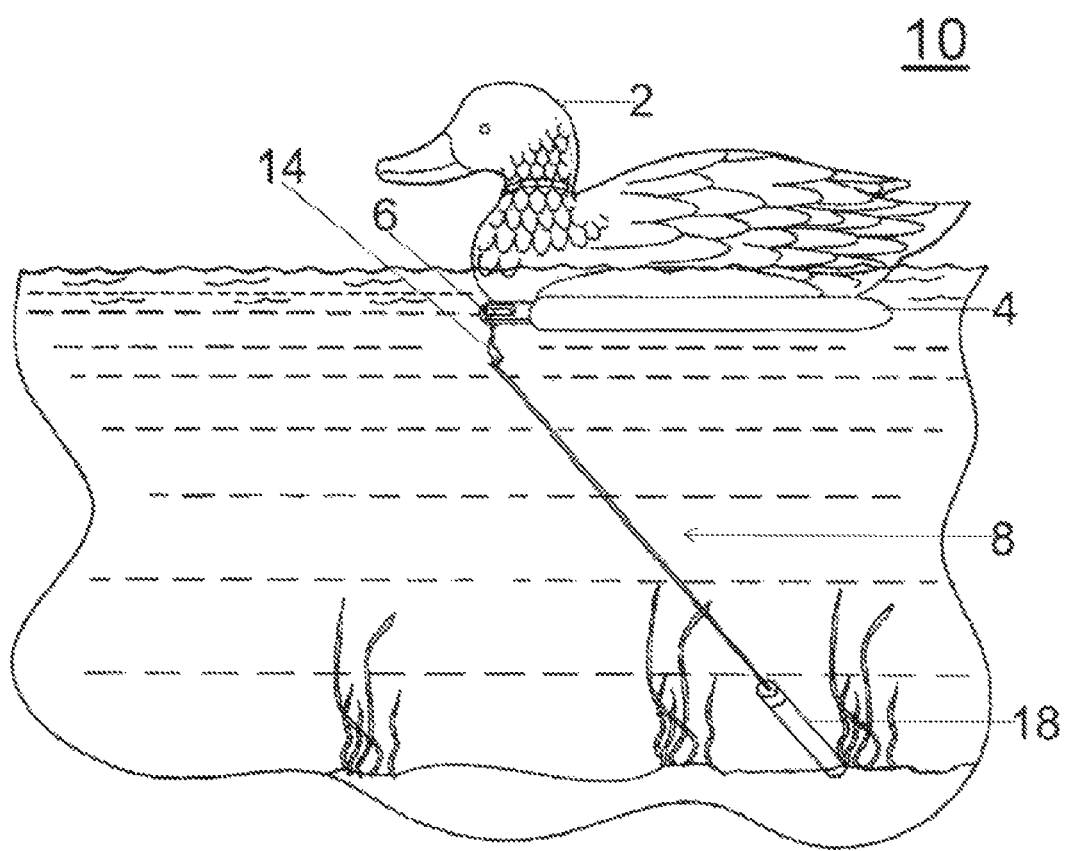
FIG. 1 is a partial perspective view illustrating a puddle duck decoy attached to one of the lineless, rigid-rod-anchor-weight assemblies of the present invention set for use in a shallow body of water.

2 Puddle duck decoy with receiver hole 6 in keel 4.
2a Puddle duck decoy with receiver hole 6a above keel 4a.
4 Keel of duck decoy 2 with receiver hole 6 in keel.
4a Keel of duck decoy 2 with receiver hole 6a above keel 4a.

6 Receiver hole of keel 4 for receiving anchor-weight attachment means 14.
6a Receiver hole above keel 4a for receiving anchor-weight attachment means 14.
8 Lineless rigid-rod-anchor-weight assembly.
10 Puddle duck decoy attached to rigid-rod-anchor-weight of the present invention, set for use in a shallow body of water.
12 Rigid-rod connection means which is not-elastic or plastic and is a molded part of the anchor-weight.
14 An optional attachment means of about two inches or less for attaching rod 12 to connector means 16.
16 A connector attachment means, such as a Coast Lock clip attachment to be used either between rigid-rod 12 and receiver hole 6 of keel 4 or optional attachment means 14 and rigid-rod 12.
18 Molded anchor-weight.
20 Adapter for use with keel 4a.
20 Endcap of 18.
24a Aperture.
24b Aperture.
26 Solid lead core of anchor-weight 18.
28 Stabilizing support to maintain rigid-rod 12 until molten lead solidifies.
30 Encapsulation means for encapsulating solid lead core 26 of anchor-weight 18.
32a End cap.
32b End cap with optional flange.
40 Open end through which molten lead is poured.

DEFINITION SECTION

Bend diameter, as used herein, refers to the diameter of the bend in a wire, fiber, or cable. Too severe a bend will cause a crimp, crack, or break in a wire or fiber, in the shielding or insulation surrounding it or the cable in which it resides, or otherwise will compromise the integrity of the physical medium or cabling system. Cable specifications include bend tolerances, generally stated in terms of minimum bend diameter. See illustration 1, below, where the bend diameter is 14 cm.

Figure 4:
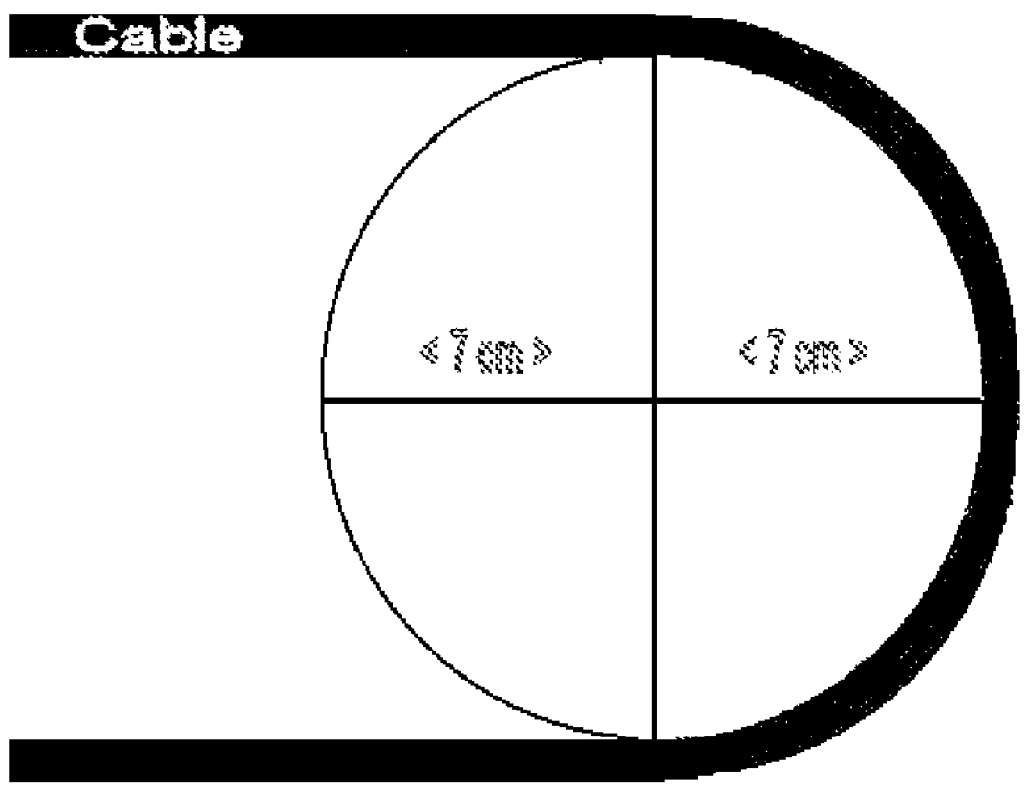
FIG. 4 a sketch illustrating a cable with a 7 cm bend radius.

Bend radius measured to the inside curvature, is the minimum radius one can bend a pipe, tube, sheet, cable, or hose without kinking it, damaging it, or shortening its life. The smaller the bend radius, the greater is the material flexibility, that is, as the radius of curvature decreases, the curvature increases). See FIG. 4 illustrating a cable with a 7 cm bend radius. The minimum bend radius is the radius below which an object such as a rod or cable should not be bent to avoid permanent damage to the rod or cable.

Fiberglass, as used herein, refers to materials made from extremely fine fibers of glass. Fiberglass is used as a reinforcing agent for many polymer products; the resulting composite material, properly known as fiber-reinforced polymer (FRP) or glass-reinforced plastic (GRP), is called "fiberglass" in popular usage.

Fiberglass solid rod, as used herein, refers to solid, round rods made of fiberglass or reinforced fiberglass that are used in a wide range of applications, providing a unique combination of corrosion resistance, high strength, dimensional stability, having a high modulus of elasticity, and are light weight, along with low thermal and electric conductivity and low maintenance service in areas where steel, aluminum or wood components were traditionally specified.

The "minimum bend radius" of fiberglass rods or cables is of considerable importance, because if the rod or cable is bent so that its bend radius is less that the material's minimum bend radius, the rod or cable is likely to break, crimp, or crack. The accepted minimum bend radius of a rod or cable of fiberglass is between 50-80 times the diameter of the rod of cable. By way of comparison, the minimum bend diameter of material that has the flexibility to be tied into a knot is zero.

Fiberglass rods or cable is UV resistant, and has corrosion resistance to provide long life in aggressive acidic or caustic environments. Fiberglass rods or cables are lightweight and has high strength which allows for more dependable support-to-weight ratio than steel, and has dimensional stability to maintain the cross-section of structural shapes based on a low coefficient of thermal expansion.

Physical Properties of a Fiberglass Solid Rod

Tensile strength 414-827 MPA (60-120K)
Tensile Modulus 20.6-41.4 MPa (3000-6000 k psi)
Flexural Strength 414-827 MPA (60-120K)
Flexural Modulus 20.6-41.4 MPa (3000-6000 k psi)
Minimum Bend Diameter 50 to 80 times the diameter.

Flexible, as used herein, refers to a material that can be bent and flexed and that is pliable, i.e., easily bent or shaped i.e., material that can be tied into a knot. A material that can be bent or folded to the point of being used to tie a knot has a minimum bend radius of zero.

Flexure, as used herein, refers to the ability of a material to be forced into a curved shape, such as the flexure of a straight rod. A limited amount of flexure, as used herein, means that the material may be forced into a limited, gentle curve so that its cross-section defines an arc wider than an arc of a closed circle, but the material cannot be bent to form a sharp angle (defined as the space between two lines diverging from a common point).

Keel, as used herein, refers to any weight attached to the bottom of a floating device to prevent the device from being tipped over, as from being tipped over by the wind.

Latex tubing, as used herein, refers to tubing that is made from latex so as to be flexible and elastic, as is witnessed by its "Elongation at Break" value, in fact latex tubing is known for its memory after repeated stretching. It will maintain memory after repeated stretching or pulsating applications. Known for its extreme flexibility, such latex tubing is used extensively in the health care industry, and in other applications such as drain tubing, exercise devices, elastic bands, slingshots, and tourniquet bands, etc. The physical properties of latex tubing include: a minimum bend radius of 0; modulus at 300% 190 PSI max; has a tensile strength of 3,500 PSI min; a Shore A durometer hardness of 35±5, a elongation at break 750% Min and a specific gravity of 0.95.

Lead is a true metal that is very dense having a density of 11.34 grams per cubic meter.

Line, as used herein, refers to a connecting cable, rope, string, or wire that exhibits either elasticity or flexibility or both and has a minimum bend radius of zero.

Lineless, as used herein, refers to an assembly that does not require and does not use a line in order to perform its function.

Minimum bend radius, as used herein, refers to the radius below which an object such as a cable should not be bent to prevent kinking it, damaging it, or shortening its life. The minimum bend radius is of particular importance in the handling of fiber-optic cables, which are often used in telecommunications. The minimum bending radius will vary with different cable designs. The manufacturer should specify the minimum radius to which the cable may safely be bent during installation, and for the long term.

Receiver aperture, as used herein, refers to any opening, hole, or aperture designed for the attachment of something, which in this case is a flexible attachment means such as a cord, a wire, or the like.

Rigid, as used herein, refers to a material that has a minimum bend ratio of at least 50 to 80 times its diameter when formed into a rod or cable-like shape and that is not flexible or elastic, i.e., could not be tied into a knot.

Rigid-rod, as used herein, refers to a round, solid rod of any relatively rigid material, where relatively rigid means that the rod has a minimum bend radius of about 50-80 times its diameter, i.e., a very limited amount of flexure, but does not posses the flexibility required to bend to the extent that the rod could be tied into a knot or tangled.

Sharp angle as used herein, refers to the space between two lines diverging from a common point.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to provide for embodiments in various sizes, shapes, and forms. For example, a floatable object may be a decoy, such as a puddle duck decoy or a buoy to signal water depth. The length of the rigid-rod would be determined, in part, by the depth of the water in which the floatable object is being used. The size and volume of the anchor weight would also depend on such factors as the depth of the water, the size of the floatable object, and so forth. Therefore, the embodiments described herein are provided with the understanding that the present disclosure is intended as illustrative and is not intended to limit the invention to the embodiments described.

The principles of the present invention provide for a "lineless" rigid-rod-anchor-weight assembly and to a method for making the assembly. "Lineless" means that the anchor-weight assembly of the present invention does not include a line. A line, as the term is defined herein, is a length of material that is either elastic, flexible, or both and has a minimum bend radius that provides for the line to be flexible enough to easily become tangled with other lines or a minimum bend radius of zero which provides for the material to be tied into a knot. Thus, a lineless anchor-weight assembly comprises a an anchor weight having molded within itself one end of a rigid connecting rod, so that weight and rod become one unit, i.e., the weight and rod become inseparable, where the other end of the rigid-rod has a detachably attached attachment means, such as a snap lock, to attach the rigid-rod anchor-weight assembly to a floatable object, such as duck decoy. The rigid connecting rod, molded into the anchor weight, results in an environmentally safe, hermetically encapsulated rigid-rod-anchor-weight assembly. The impermeable encapsulate may be a synthetic organic polymer, such as a polyvinylchloride. One of the physical properties of the rigid connecting rod, which in this example, is made from fiber glass, is a minimum bend radius of from 50 to 80 times its diameter which gives the rod a very limited amount of flexure, but cannot bend and cannot be described as flexible (refer to physical property data in Definitions Section) and thus could not be tied into a knot or become tangled with other near by rigid connecting rods of other decoys. In the one favored embodiment that is illustrated herein, the rigid connecting rod is made from a fiberglass rod of ¼ inch diameter that offers strength and rigidity with a very limited amount of flexure. A diameter of ¼ inch diameter gives a minimum bend radius of 12.5 to 20 inches, which would give a diameter of from 25 to 40 inches, which is from about 2 to over 3 feet. This is, it must be agreed, a limited amount of flexure.

In the embodiment illustrated herein, the floatable object is a decoy, such as a puddle duck decoy. As mentioned above, puddle ducks rarely dive for their food and, therefore, are most often found feeding in shallow water, often from 3 to 18 inches deep. Decoys traditionally have a keel having a receiver aperture for receiving an anchor-weight attachment clip, which may be a Coast Lock snap. The snap or clip detachably attaches the rigid-rod-anchor-weight-assembly to the decoy. If the decoy has its receiver aperture positioned above the keel, the anchor-weight attachment means may further comprise an optional attachment adapter to provide for attaching the anchor-weight and rod to the aperture positioned above the keel. When the invention is made exclusively for use in puddle duck hunting, the length of the rigid connecting rod is calculated based on the average water depth that relevant species of waterfowl inhabit. As mentioned above, puddle ducks feed in water that is 18 inches deep or less and will normally land in water of the same average depth, therefore the length of the rigid-rod is contemplated to be between about 14 and 34 inches. The anchor-weight, used in the puddle duck hunting embodiment, should weigh about 9-ounces. This weight provides enough anchoring power to hold any puddle duck type decoy in place in water as deep as 32 inches. While wind may move the ducks about, the rigid-rods connecting each decoy to an anchor weight provide for the pattern of the sets placed in open, shallow areas to hold even as the wind shifts. Moreover, setting patterns becomes much easier to manage with the clip-on anchors of the present invention. The number of decoys a hunter can set depends only on how many rigid connecting rods the hunter can wrap his or her hand around. With just a little practice, duck decoys can be thrown two, three, or four at a time, without the need to unwind lines and keep them separated. Yet another advantage of the present advantage is that the time required to takedown a set of decoys at the end of hunt is greatly reduced to just a few minutes. To take down a set of decoys, the hunter lifts the decoy assembly by grabbing one rigid connecting rod connected to a decoy at a time until the entire set is in his. Instead of having to wind a flexible connecting line onto each individual duck as is required when using the traditional system. Again, the carrying capacity of retrieved decoys depends on a hunter's fist size, not bag width or throwing abilities. The inventor first tested his decoy anchor in the Niagara River shallows. It works ideally, as intended, when used for puddle duck hunting in shallow waters. The time required to set a dozen decoys in front of a blind using the present invention can be cut to less than half the time required if flexible connecting lines were to be used, and the time required to untangle the flexible lines before or after the hunt is virtually eliminated. Stored end to end, a dozen anchors easily fit in a 6-inch bag ready for a quick draw and setup for the next hunt. The attachment means in the illustrated embodiment is a Coast Lock style clip with a 150 pound test strength. If so desired, the clip is attached to one end of the rigid-rod with a short length, about two inches, of waterproof, 200 pound test, braided attachment line. There is a protective rubberized cap at the tip of the rod which helps prevent snagging and prevents damage to the rod tip.

Turning now to the drawings, FIG. 1, a partial perspective view, illustrates lineless, rigid-rod-anchor-weight assembly 8 attached to a floating object, such as a duck decoy, according to the principles of the present invention. Puddle duck decoy 2 is used herein for illustration purposes, although it is to be understood that the lineless anchor-weight assembly may be used with any other type of floating device, such as a buoy or a marker for instance. In particular, FIG. 1 shows duck decoy 2 set for use in a shallow body of water. Decoy 2 is shown attached to lineless rigid-rod-anchor-weight assembly 8. Lineless rigid-rod-anchor-weight assembly 8 comprises rigid connecting rod 12 having one end permanently molded into anchor-weight 18 and the other end attached to attachment means 14, which for example, could be a Coast Lock style clip, for firmly, but detachably attaching the rigid-rod-anchor-weight assembly to the decoy. Attachment means 14 attaches lineless rigid-rod-anchor-weight assembly 8 to decoy 2 using receiver hole 6 positioned in keel 4 of decoy 2. Rigid connecting rod 12 has the functional amount of rigidity required to ensure that there will be no tangling of the connecting rods of a set of assemblies where each assembly is attached to a decoy. Thus, with a minimum bend radius of from 50 to 80 times the diameter of the rod, rigid connecting rod 12, having a diameter of about ¼ inch, eliminates the tangling problems presented by the flexible lines used by others by eliminating the use of any flexible line.

Figure 2:
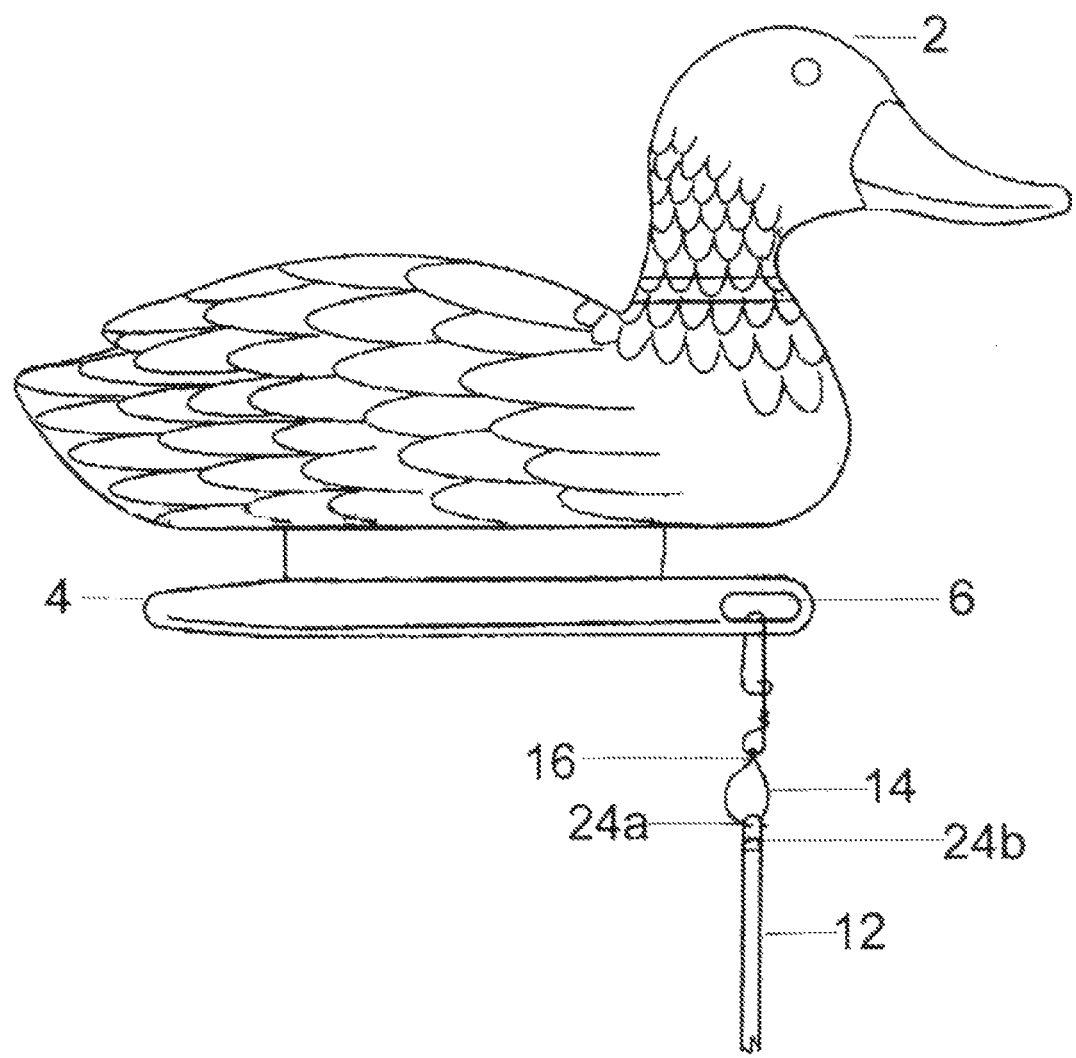
FIG. 2 is an enlarged elevation sectional view of the decoy attached to one of the lineless, rigid-rod-anchor-weight assembly of the present invention, as shown in FIG. 1, for better illustrating the means used to attach the lineless, rigid-rod-anchor-weight assembly to a decoy using a receiver hole situated in the keel.

FIG. 2, an enlarged sectional elevation view, illustrates the decoy and the attachment clip that attaches the lineless rigid-rod-anchor-weight assembly of the present invention to the decoy. The embodiment shown in FIG. 2 is one example of an attachment means that may be used to attach the lineless anchor-weight assembly to a floating object, such as to decoy 2. In the example shown, a first end of connector means 16 is attached to decoy 2 using receiver aperture 6, which is functionally situated in keel 4. As illustrated, connector means 16 is a coast lock snap/clip with a 150 pound test strength. Connector means 16 is attached to rod 12 using waterproof, 200 pound test, braided connector 14 of about or less than two inches total length. It is to be understood that instead of being a coast lock snap, clip connector means 16 may be a swivel snap or any other functional connector. A second end of the optional braided connector attachment means 14 is attached to a first end of rod 12 through aperture 24a. If desired, only one of the attachment means illustrated may be used. For example, connector means 16 may be configured to be attached directly to the aperture in rod 12. When used with a typical duck decoy, it is recommended for connector means 16 to have strength capable of handling the torque that is created when the decoy with the lineless anchor-weight assembly attached is deployed by throwing. Those with ordinary skill in the art are familiar with the multitude of attachment means that may be used to attach the lineless anchor assembly to a floating object and thus, these need not be discussed any further here. Those of ordinary skill in the art will also appreciate that the connectors 14 and 16 are connectors, that is, they are attachment means or devices, such as lock style clasps or clips, and are definitely not lines, in that the sense that they are not the types of flexible lines or cords such as those used traditionally to connect an anchor weight to a decoy.

Figure 2A:
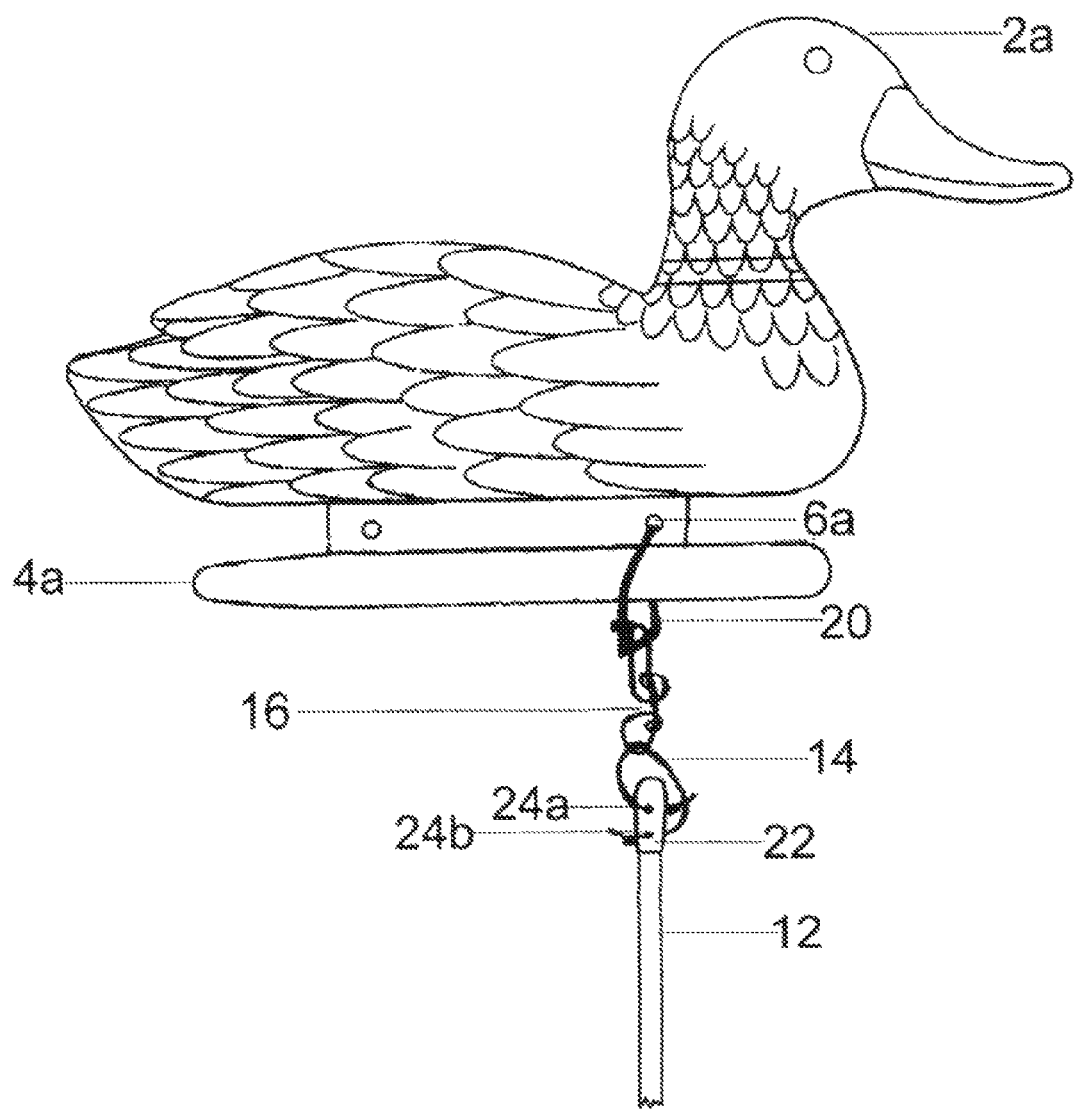
FIG. 2a is an enlarged elevation view of a decoy attached to a lineless, rigid-rod-anchor-weight assembly of the present invention different from the decoy as shown in FIG. 1 in that the receiver hole is above the keel of the decoy.

FIG. 2a, an enlarged sectional planar view similar, but different to the view presented in FIG. 1 in that the receiver hole used to receive the attachment means of the lineless rigid-rod-anchor-weight assembly, is positioned above the keel of the decoy. In this example, a first end of connector means 16 is attached to adapter attachment means 20 which in turn is attached to receiver aperture 6a which is functionally situated in keel 4a of decoy 2a. Now, in the same manner as is illustrated in FIG. 2, a second end of clip connector means 16 is attached to a first end of attachment means 14, although connector means 16 could be attached directly to rigid-rod 12. A second end of attachment means 14 is attached to a first end of rod 12 through apertures 24a and 24b. As mentioned above, when used with a typical duck decoy, it is recommended that connector means 16 has the strength required to handle the torque created when a decoy with the lineless anchor-weight assembly attached is deployed by throwing.

Figure 3A:
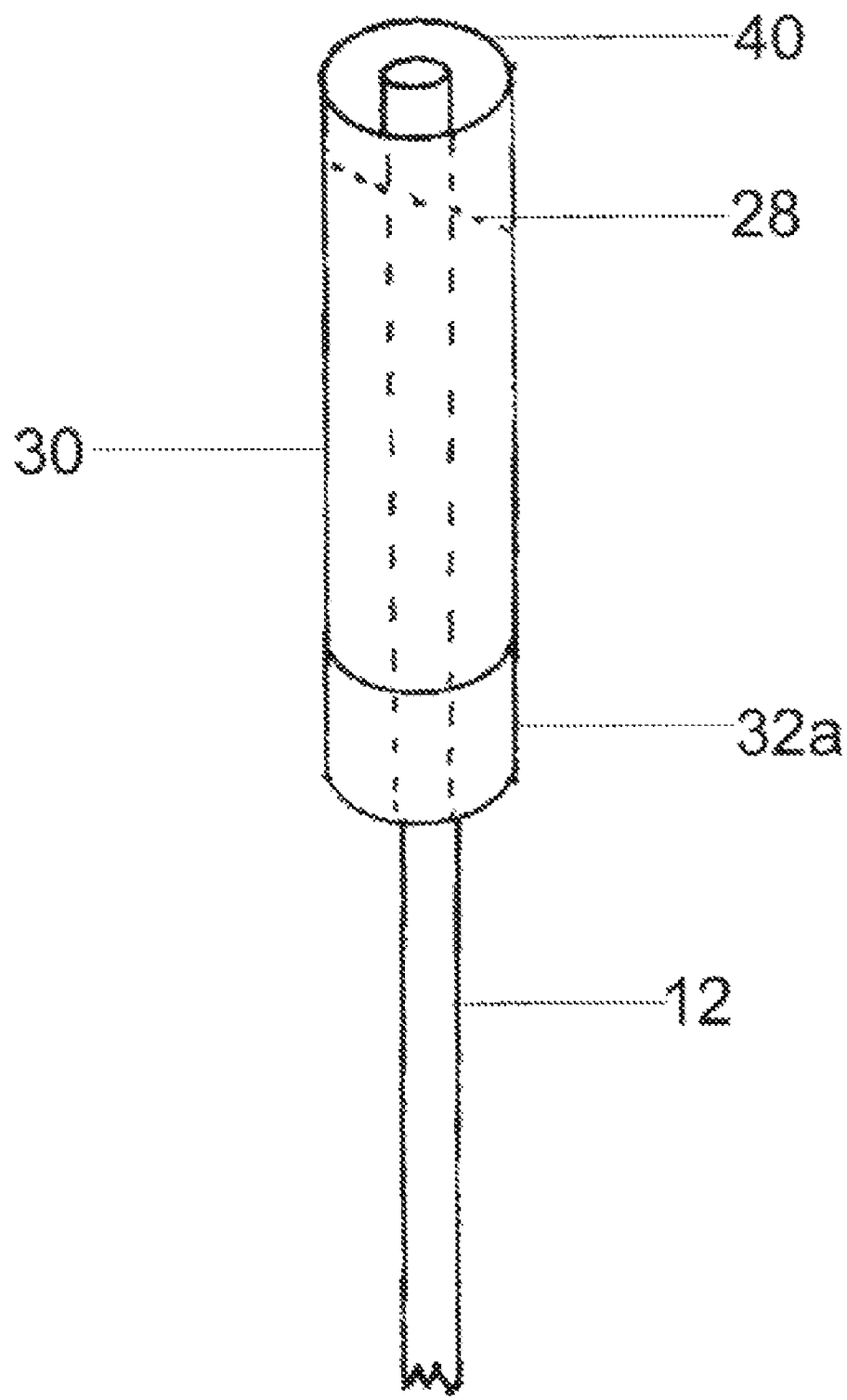
FIG. 3a is a perspective view illustrating the how the rigid-rod part of the anchor-weight of this invention is molded into the weight. Note the one end of the rigid-rod part extends to the bottom end of the encapsulating means, which in this "up-ended" orientation is open and positioned to receive the molten lead that provides the weight.

FIG. 3A, a perspective view, illustrates tubular encapsulating anchor-weight container 30 with rigid-rod 12 centered within it ready for molten lead to be poured into its temporarily open end 40. In this example, encapsulating weight container 30 is polyvinylchloride to which the molten lead will bond as it hardens inside container 30. The end of container 30 opposite its open end is a closed end which is shown capped by end cap 32a. Rod 12 is shown positioned in the center of encapsulating means 30 and protrudes through end cap 32a, which can be seen in FIG. 3B. The opening in end cap 32a through which rod 12 protrudes is thoroughly sealed to prevent the environment from coming into any contact with the lead inside of encapsulating means 30. To avoid the displacement of rod 12 away from its centered position in container 30 during the pouring of the molten lead, rod 12 includes metal support 28.

Figure 3B:
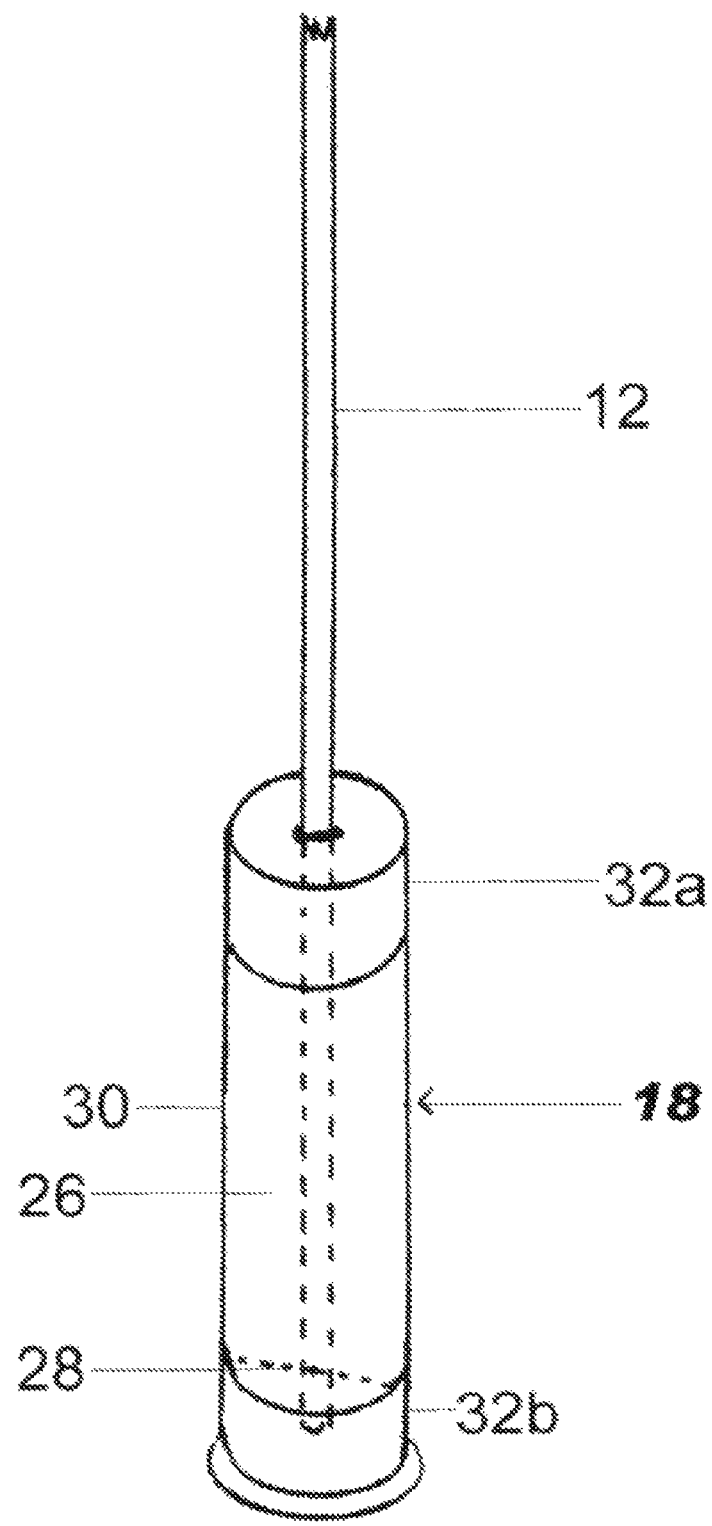
FIG. 3b is a perspective view illustrating the rigid-rod-anchor-weight assembly of this invention, oriented in it "in use" position, after the molten lead that was poured into the encapsulating means has set and with an end cap providing a secure seal over the previously open end of the encapsulation means.

As can be seen in FIGS. 3A and 3B, support 28 is shown as a straight member extending through rigid-rod 20 in a direction substantially perpendicular or transverse to the longitudinal or length-wise direction of the rigid-rod, for forming a substantially t-shaped intersection between the rigid-rod and support 28. Support 28 is shown located at the end of the rigid-rod proximate to open end 40 of container 30, which end is opposite from the end of the rigid-rod which secures to duck decoys, or the like. Support 28 is included, for example, as a stabilizing support to maintain a position of rigid-rod 20 while the molten lead solidifies. For example, as can be seen in FIGS. 3A and 3B and in accordance with the above described purpose, substantially equal lengths of support 28 extend from rod 30 for engaging against the walls of container 30 for preventing rigid-rod 12 from shifting with respect to the container, thereby centering the rigid-rod with respect to the anchor while the lead solidifies. As shown in FIG. 3B, after the lead has solidified, support 28 is encased in lead core 26 of anchor 18.

FIG. 3B, another perspective view of the anchor-weight of this invention, illustrates anchor-weight 18 after the molten lead was poured into the encapsulating means and set with end cap 32b providing a secure seal over the previously open end of the encapsulation means. Capping means 32b is sealed over the open end to complete the encapsulation of the lead providing for a heavy lead weight to be safely used in salt or fresh water. In the example provided in FIG. 3b, capping means 32b is shown having a flanged end. The flange, as it gets caught on the mud at the bottom of the water body, provides extra stability for the weight. The flange is optional and may be provided in any number of constructions, such as having finger like struts that will add gripping power to the weight. At this point the desired attachment means for attaching the lineless weight assembly to a floating object are attached to a first end of rod 12 and the assembly is ready for use.

In a preferred embodiment, rod 12 is made from a synthetic organic polymer, such as fiberglass having a minimum bend radius of 50 to 80 times the diameter of the rod. The diameter of the rod is about ¼ inch. Alternatively, the rod is made of a naturally-occurring material that possesses the rigidity required to eliminate any problems from tangling while maintaining a minimal degree of flexure, i.e., having a minimum bend radius of 50 to 80 times its diameter. In the example shown, rod 12 is contemplated to be solid for added strength.

Additionally, rod 12 is contemplated to be lightweight for ease of handling and carrying. The rod may be of any desired length, with the depth of the body of water where the hunting will occurs being a deciding factor for the length of the rod.

To use the lineless rigid-rod-anchor-weight assembly, the assembly is first attached to a floatable object, such as a puddle duck decoy, using the clip attachment means provided with the lineless rigid-rod-anchor-weight assembly. Even if a set of objects, such as a set of puddle duck decoys are to be used, the entire set may be easily lifted at the same time by grabbing either the rigid connecting rods or the handles (i.e., the weights) of each decoy to effectively grasp the entire set. The set may then be placed into a decoy bag for transport to a hunting site. At the site, the set of decoys with the attached weights may be removed from the decoy bag ensemble as a set by grabbing either the rigid connecting rods or the handles of the entire set. The decoys may then be thrown into position by grabbing the weight that functions also as a handle for throwing the decoy. The decoys may be thrown individually or in groups, as there are no lines to tangle. Once the decoys hit the water, the weight that is molded into the assembly drops to the water's bottom and holds the decoys in place, When the hunt has ended, the decoys may be easily retrieved and placed into the decoy bag for transport and storage with their anchor assemblies still attached without the problems of tangling that are inherent in presently available anchor-weight assemblies that rely on connecting lines that are so flexible that the lines may be tied into knots deliberately or accidentally, which usually results in a tangling problem. Alternatively, if desired, the anchor assemblies may be easily and rapidly removed from the decoys by opening the heavy duty clasp of the assembly.

Thus it has been shown that the present invention has eliminated all of the problems of tangling and pollution presented by presently available decoys that all offer elastic and/or flexible lines to attach a metal weight to a decoy. The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A lineless rigid-rod-anchor-weight apparatus for a floatable object formed by a process comprising:
    (a) providing a substantially cylindrical container having an opened end, said container formed from a substantially waterproof material;
    (b) providing a rigid rod having a first end and a second end, said first end detachably securable to a floatable duck decoy;
    (c) extending a support transversely from said rod proximate to said second end of said rod;
    (d) inserting said rod through a closed end of said container, such that said second of said rod is positioned within said container;
    (e) forming a metallic anchor core by pouring molten metal into said container through said opened end, wherein said support is operatively arranged to center said rod with respect to said container during said pouring of said molten metal;
    (f) solidifying said molten metal directly around said second end of said rod and said support for encasing said support and said second end of said rod in said metallic anchor core for securing said anchor core immovably to said rod; and,
    (g) securing an end cap on said container for closing said opened end and encapsulating said metallic anchor core.

2. The apparatus, as recited in claim 1, wherein a length of said rigid rod is determined by a depth of the water in which the apparatus will be used.

3. The apparatus, as recited in claim 1, wherein said apparatus further has an attachment device.

4. The apparatus, as recited in claim 3, wherein said attachment device is detachably attached to said first end of said rod.

5. The apparatus, as recited in claim 4, wherein said attachment device is structured so as to detachably attach said apparatus to said floatable object so as to maintain the floatable object in a desired floating position eliminating the use of flexible lines to connect said apparatus to said floatable object preventing tangling of such flexible lines.

6. The apparatus, as recited in claim 3, wherein said attachment device further comprises a Coast Lock style clip.

7. The apparatus, as recited in claim 3, wherein said attachment device further comprises a flexible fastener having a first fastener end and a second fastener end, said first fastener end adapted for fastening to said floatable object through an aperture spaced from the bottom of said floatable object, said second fastener end adapted for fastening to said first end of said rod.

8. The apparatus, as recited in claim 1, wherein said metallic core is impermeably sealed using a synthetic organic polymer.

9. The apparatus, as recited in claim 8, wherein said synthetic organic polymer is a polyvinylchloride.

10. The apparatus, as recited in claim 1, wherein said rod is made from a synthetic organic polymer.

11. The apparatus, as recited in claim 10, further comprising wherein said synthetic organic polymer is a fiberglass.

12. The apparatus, as recited in claim 1, further comprising wherein said rod has a diameter of about a quarter of an inch.

13. The apparatus, as recited in claim 1, further comprising wherein said end cap has a flange for securing said anchor weight to the bottom of said body of water.

* * * * *

UNITED STATES PATENT AND TRADEMARK OFFICE
CERTIFICATE OF CORRECTION

| | | |
|---|---|---|
| PATENT NO. | : 8,028,462 B2 | Page 1 of 1 |
| APPLICATION NO. | : 12/643425 | |
| DATED | : October 4, 2011 | |
| INVENTOR(S) | : Robert A. Sieman | |

It is certified that error appears in the above-identified patent and that said Letters Patent is hereby corrected as shown below:

*In The Claims*

Column 14, lines 6-8, Claim 1, should read: "(d) inserting said rod through a closed end of said container, such that said second end of said rod is positioned within said container;"

Signed and Sealed this
Sixteenth Day of December, 2014

Michelle K. Lee
*Deputy Director of the United States Patent and Trademark Office*